(12) United States Patent
Takaoka

(10) Patent No.: US 12,077,942 B2
(45) Date of Patent: Sep. 3, 2024

(54) SYSTEM AND A METHOD FOR CONTROLLING A WORK MACHINE

(71) Applicant: KOMATSU LTD., Tokyo (JP)

(72) Inventor: Yukihisa Takaoka, Tokyo (JP)

(73) Assignee: KOMATSU LTD., Tokyo (JP)

( * ) Notice: Subject to any disclaimer, the term of this patent is extended or adjusted under 35 U.S.C. 154(b) by 405 days.

(21) Appl. No.: 17/426,663

(22) PCT Filed: Apr. 7, 2020

(86) PCT No.: PCT/JP2020/015669
§ 371 (c)(1),
(2) Date: Jul. 29, 2021

(87) PCT Pub. No.: WO2020/217972
PCT Pub. Date: Oct. 29, 2020

(65) Prior Publication Data
US 2022/0106768 A1    Apr. 7, 2022

(30) Foreign Application Priority Data
Apr. 24, 2019  (JP) .................................. 2019-082975

(51) Int. Cl.
*E02F 9/20*      (2006.01)
*E02F 9/26*      (2006.01)

(52) U.S. Cl.
CPC ............ *E02F 9/2045* (2013.01); *E02F 9/262* (2013.01)

(58) Field of Classification Search
CPC ..... G05D 1/0212–0219; G05D 1/0287; G05D 1/0291; G05D 2201/0201;
(Continued)

(56) References Cited

U.S. PATENT DOCUMENTS

| 6,112,143 A | 8/2000 | Allen et al. |
| 2018/0355587 A1* | 12/2018 | Hashimoto ............. E02F 3/841 |

(Continued)

FOREIGN PATENT DOCUMENTS

| JP | 10-88624 A | 4/1998 |
| JP | 2002-522673 A | 7/2002 |

(Continued)

OTHER PUBLICATIONS

The International Search Report for the corresponding international application No. PCT/JP2020/015669, issued on Jun. 16, 2020.

*Primary Examiner* — Spencer D Patton
(74) *Attorney, Agent, or Firm* — Global IP Counsels, LLP

(57) ABSTRACT

A system includes an input device, a display, and a processor that receives a signal indicative of operation of the input device and outputs a signal to display an image on the display. The processor acquires current terrain data and displays a site image indicative of at least a part of a work site on the display based on the current terrain data. The processor acquires area data including a position and size of a work area designated by the input device on the site image. The processor acquires work data indicative of a work direction in the work area. The processor determines an arrangement of a plurality of work lanes extending in the work direction in the work area based on the area data and the work data. The processor sends an automatic operation command to the work machine according to the arrangement of the work lanes.

20 Claims, 20 Drawing Sheets

(58) Field of Classification Search
CPC ... G05D 2201/0203; G05D 2201/0208; G05D 2201/0215; E02F 9/2045; E02F 9/262; E02F 9/2037; E02F 9/205; E02F 9/2054
See application file for complete search history.

(56) References Cited

U.S. PATENT DOCUMENTS

| | | | | |
|---|---|---|---|---|
| 2018/0374168 | A1* | 12/2018 | Kano | G06Q 50/08 |
| 2020/0033143 | A1* | 1/2020 | Hiramatsu | G05D 1/0219 |
| 2020/0117201 | A1* | 4/2020 | Oetken | G05D 1/0214 |
| 2021/0131073 | A1 | 5/2021 | Wisley et al. | |

FOREIGN PATENT DOCUMENTS

| | | |
|---|---|---|
| JP | 2018-120491 A | 8/2018 |
| WO | 2017/170968 A1 | 10/2017 |
| WO | 2018115212 A1 | 6/2018 |

\* cited by examiner

SYSTEM AND A METHOD FOR CONTROLLING A WORK MACHINE

CROSS-REFERENCE TO RELATED APPLICATIONS

This application is a U.S. National stage application of International Application No. PCT/JP2020/015669, filed on Apr. 7, 2020. This U.S. National stage application claims priority under 35 U.S.C. § 119(a) to Japanese Patent Application No. 2019-082975, filed in Japan on Apr. 24, 2019, the entire contents of which are hereby incorporated herein by reference.

BACKGROUND

Field of the Invention

The present disclosure relates to a system and a method for controlling a work machine.

Background Information

A system for remotely controlling a work machine is conventionally known. For example, a construction management system of Japan Laid-open Patent Application Publication No. 10-88624 includes a monitor and an operation panel. The monitor displays a position of a work machine, a current construction status, and a construction plan in real time. The work machine is remotely controlled by the operation panel.

SUMMARY

By automating the work machine, an efficiency of the system can be improved. However, even in that case, a person needs to manage the work machine from a remote location and give a command to the work machine for an automatic operation. In particular, in work such as slot dosing, a plurality of work machines are used at the same time in one work site. Therefore, it is complicated to give the command for the automatic operation to each of the plurality of work machines.

An object of the present disclosure is to provide a system and a method capable of easily instructing a work machine to perform an automatic operation.

Solution to Problem

A first aspect is a system for controlling a work machine at a work site, including an input device, a display, and a processor. The input device is operable by an operator. The processor receives a signal indicative of an operation to the input device. The processor outputs a signal to display an image on the display.

The processor acquires current terrain data indicative of a current terrain of the work site. Based on the current terrain data, the processor displays a site image showing at least a part of the work site on the display. The processor acquires area data. The area data includes a position and a size of a work area designated by the input device on the site image. The processor acquires work data indicative of a work direction in the work area. The processor determines an arrangement in the work area of a plurality of work lanes based on the area data and the work data. The plurality of work lanes extend in the work direction. The processor sends an automatic operation command to the work machine according to the arrangement of the work lanes.

The second aspect is a method performed by a processor for controlling a work machine at a work site. The method includes the following processing. A first process is to acquire current terrain data indicative of a current terrain of the work site. A second process is to display a site image showing at least a part of the work site on the display based on the current terrain data. A third process is to receive a signal indicative of an operation by an operator from the input device. A fourth process is to acquire area data. The area data includes a position and a size of a work area designated by the input device on the site image. A fifth process is to acquire work data indicative of a work direction in the work area. A sixth process is to determine an arrangement in the work area of a plurality of work lanes based on the area data and the work data. The plurality of work lanes extend in the work direction. A seventh process is to send an automatic operation command to the work machine according to the arrangement of the work lanes.

According to the present disclosure, an operator designates the work area using the input device to determine the arrangement of the plurality of work lanes in the work area. As a result, it is possible to easily instruct the work machine to perform the automatic operation.

DETAILED DESCRIPTION OF EMBODIMENT(S)

Figure 1:
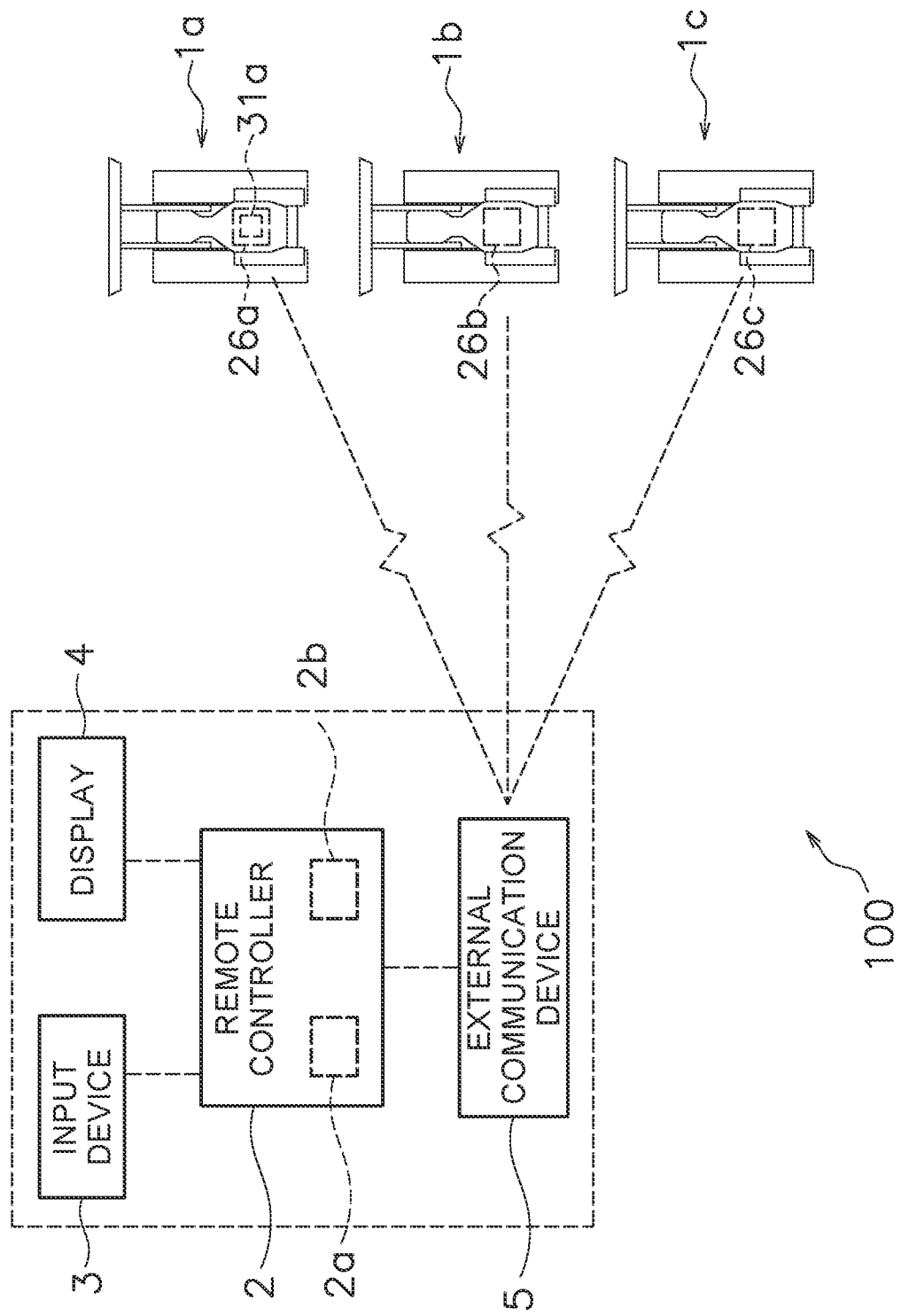
FIG. 1 is a schematic diagram showing a control system of a work machine according to an embodiment.

Hereinafter, a control system of a work machine according to an embodiment will be described with reference to the drawings. FIG. 1 is a schematic view showing a control system 100 of a work machine according to an embodiment. As illustrated in FIG. 1, the control system 100 includes work machines 1a to 1c, a remote controller 2, an input device 3, a display 4, and an external communication device 5. The control system 100 controls the work machines 1a to 1c arranged at a work site such as a mine.

The remote controller 2, the input device 3, and the external communication device 5 are arranged outside the work machines 1a to 1c. The remote controller 2, the input device 3, and the external communication device 5 may be arranged in, for example, an external management center for the work machines 1a to 1c. The remote controller 2, the input device 3, and the external communication device 5 may be arranged in a work machine other than the work machines 1a to 1c arranged in the work site. The remote controller 2 remotely controls the work machines 1a to 1c. The number of work machines remotely controlled by the remote controller 2 is not limited to three, and may be less than three or more than three.

Figure 2:
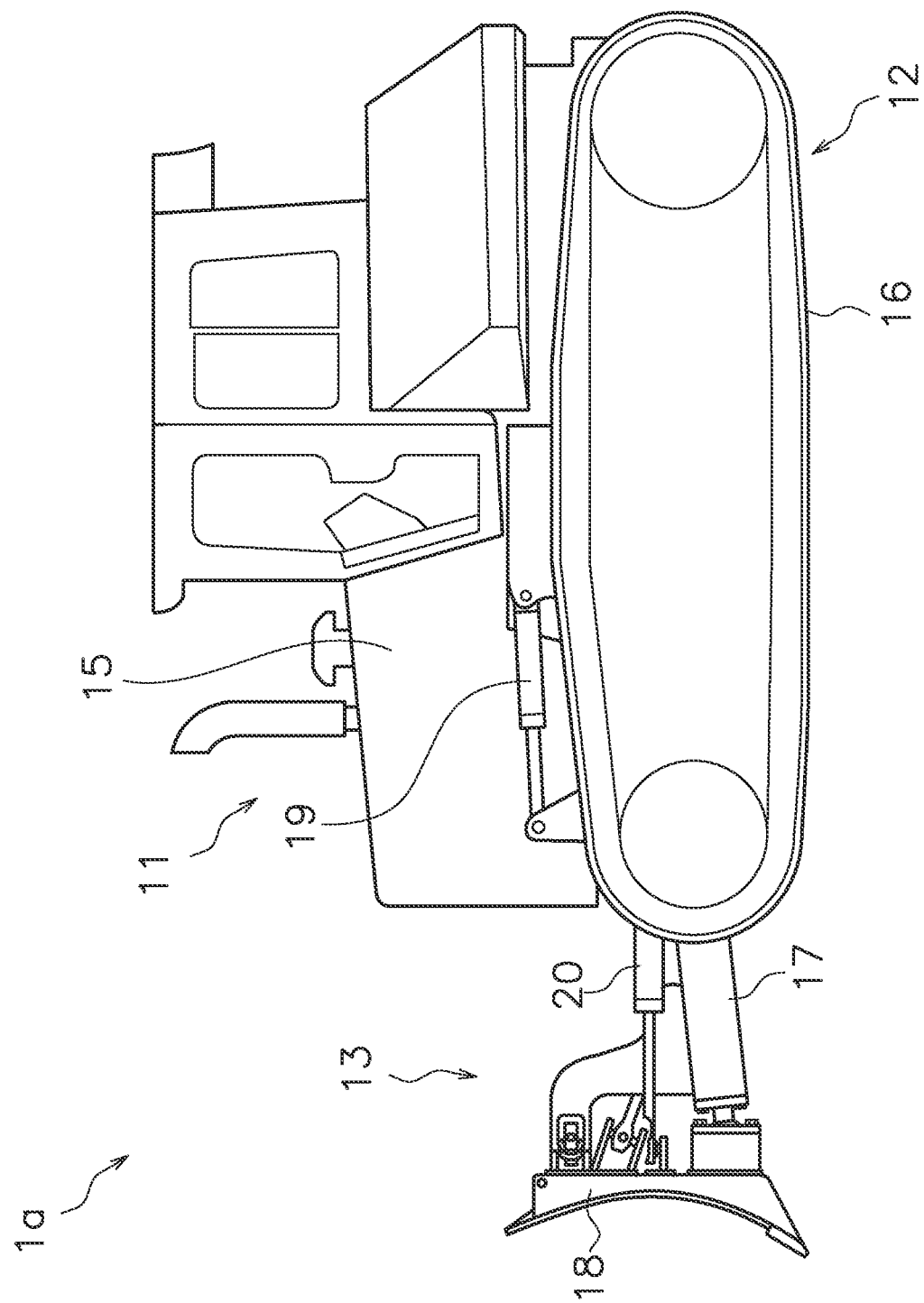
FIG. 2 is a side view of the work machine.
Figure 3:
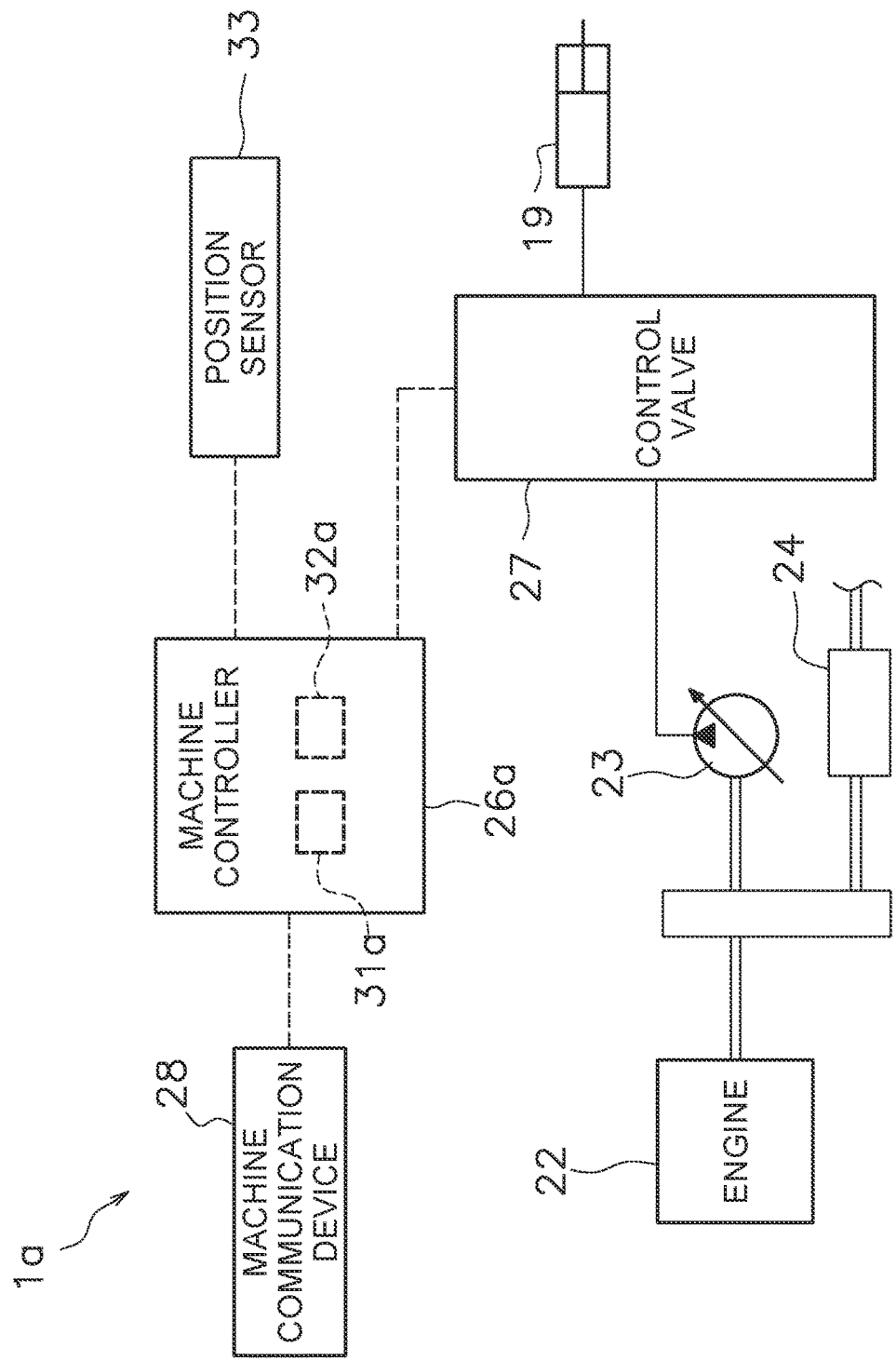
FIG. 3 is a schematic diagram showing a structure of the work machine.

FIG. 2 is a side view of the work machine 1a. FIG. 3 is a block diagram showing a configuration of the work machine 1a. The work machines 1a to 1c according to the present embodiment is a bulldozer. Hereinafter, the work machine 1a will be described, but the configurations of the other work machines 1b and 1c are the same as those of the work machine 1a.

As illustrated in FIG. 2, the work machine 1a includes a vehicle body 11, a traveling device 12, and a work implement 13. The vehicle body 11 includes an engine compartment 15. The traveling device 12 is attached to the vehicle body 11. The traveling device 12 has left and right crawler tracks 16. In FIG. 2, only the left crawler track 16 is illustrated. The work machine 1a travels by rotating the crawler tracks 16.

The work implement 13 is attached to the vehicle body 11. The work implement 13 includes a lift frame 17, a blade 18, and a lift cylinder 19. The lift frame 17 is attached to the vehicle body 11 so as to be movable up and down. The lift frame 17 supports the blade 18. The blade 18 moves up and down with the movement of the lift frame 17. The lift frame 17 may be attached to the traveling device 12. The lift cylinder 19 is connected to the vehicle body 11 and the lift frame 17. As the lift cylinder 19 expands and contracts, the lift frame 17 moves up and down.

As illustrated in FIG. 3, the work machine 1a includes an engine 22, a hydraulic pump 23, a power transmission device 24, and a control valve 27. The hydraulic pump 23 is driven by the engine 22 and discharges hydraulic fluid. The hydraulic fluid discharged from the hydraulic pump 23 is supplied to the lift cylinder 19. Although one hydraulic pump 23 is illustrated in FIG. 2, a plurality of hydraulic pumps may be provided.

The power transmission device 24 transmits the driving force of the engine 22 to the traveling device 12. The power transmission device 24 may be, for example, an HST (Hydro Static Transmission). Alternatively, the power transmission device 24 may be a torque converter or a transmission having a plurality of speed gears.

The control valve 27 is arranged between the hydraulic actuator such as the lift cylinder 19 and the hydraulic pump 23. The control valve 27 controls the flow rate of the hydraulic fluid supplied from the hydraulic pump 23 to the lift cylinder 19. The control valve 27 may be a pressure proportional control valve. Alternatively, the control valve 27 may be an electromagnetic proportional control valve.

The work machine 1a includes a machine controller 26a and a machine communication device 28. The machine controller 26a controls the traveling device 12 or the power transmission device 24 to travel the work machine 1a. The machine controller 26a controls the control valve 27 to move the blade 18 up and down.

The machine controller 26a is programmed to control the work machine 1a based on acquired data. The machine controller 26a includes a processor 31a and a storage device 32a. The processor 31a is, for example, a CPU (central processing unit). Alternatively, the processor 31a may be a processor different from the CPU. The processor 31a executes a process for controlling the work machine 1a according to the program.

The storage device 32a includes a non-volatile memory such as ROM and a volatile memory such as RAM. The storage device 32a may include an auxiliary storage device such as a hard disk or an SSD (Solid State Drive). The storage device 32a is an example of a non-transitory recording medium that can be read by a computer. The storage device 32a stores computer commands and data for controlling the work machine 1a.

The machine communication device 28 wirelessly communicates with the external communication device 5. For example, the machine communication device 28 communicates with the external communication device 5 by a wireless LAN such as Wi-Fi (registered trademark), mobile communication such as 3G, 4G, or 5G, or another type of wireless communication system.

The work machine 1a includes a position sensor 33. The position sensor 33 may include a GNSS (Global Navigation Satellite System) receiver such as GPS (Global Positioning System). Alternatively, the position sensor 33 may include a receiver for another positioning system. The position sensor 33 may include a motion sensor such as an IMU (Inertial Measurement Unit), a distance measurement sensor such as a LIDAR device, or an image sensor such as a stereo camera. The position sensor 33 outputs position data to the machine controller 26a. The position data indicates a position of the work machine 1a.

As illustrated in FIG. 1, the work machine 1b includes a machine controller 26b similar to the machine controller 26a of the work machine 1a. The work machine 1c includes a machine controller 26c similar to the machine controller 26a of the work machine 1a. The machine controllers 26b and 26c each have the same configuration as the machine controller 26a.

The external communication device 5 illustrated in FIG. 1 wirelessly communicates with the machine communication device 28. The external communication device 5 transmits a command signal from the remote controller 2 to the machine communication device 28. The machine controller 26a receives the command signal via the machine communication device 28. The external communication device 5 receives the position data of the work machine 1a via the machine communication device 28.

The input device 3 is a device that is operable by an operator. The input device 3 receives an input command from the operator and outputs an operation signal corresponding to the input command to the remote controller 3. The input device 3 outputs the operation signal corresponding to an operation by the operator. The input device 3 outputs the operation signal to the remote controller 2. The input device 3 may include a pointing device such as a mouse or a trackball. The input device 3 may include a keyboard. Alternatively, the input device 3 may include a touch screen.

The display 4 includes a monitor such as a CRT, an LCD, an OELD, or the like. The display 4 receives an image signal from the remote controller 2. The display 4 displays an image corresponding to the image signal. The display 4 may be integrated with the input device 3. For example, the input device 3 and the display 4 may include a touch screen.

The remote controller 2 remotely controls the work machines 1a to 1c. The remote controller 2 receives the operation signal from the input device 3. The remote controller 2 outputs the image signal to the display 4. The remote controller 2 includes a processor 2a and a storage device 2b. The processor 2a is, for example, a CPU (Central Processing Unit). Alternatively, the processor 2a may be a processor different from the CPU. The processor 2a executes a process for controlling the work machine 1a according to a program. In the following description, the description regarding the process executed by the remote controller 2 may be interpreted as the process executed by the processor 2a.

The storage device 2b includes a non-volatile memory such as ROM and a volatile memory such as RAM. The storage device 2b may include an auxiliary storage device such as a hard disk or an SSD (Solid State Drive). The storage device 2b is an example of a non-transitory recording medium that can be read by a computer. The storage device 2b stores computer commands and data for controlling the work machine 1a.

Figure 4:
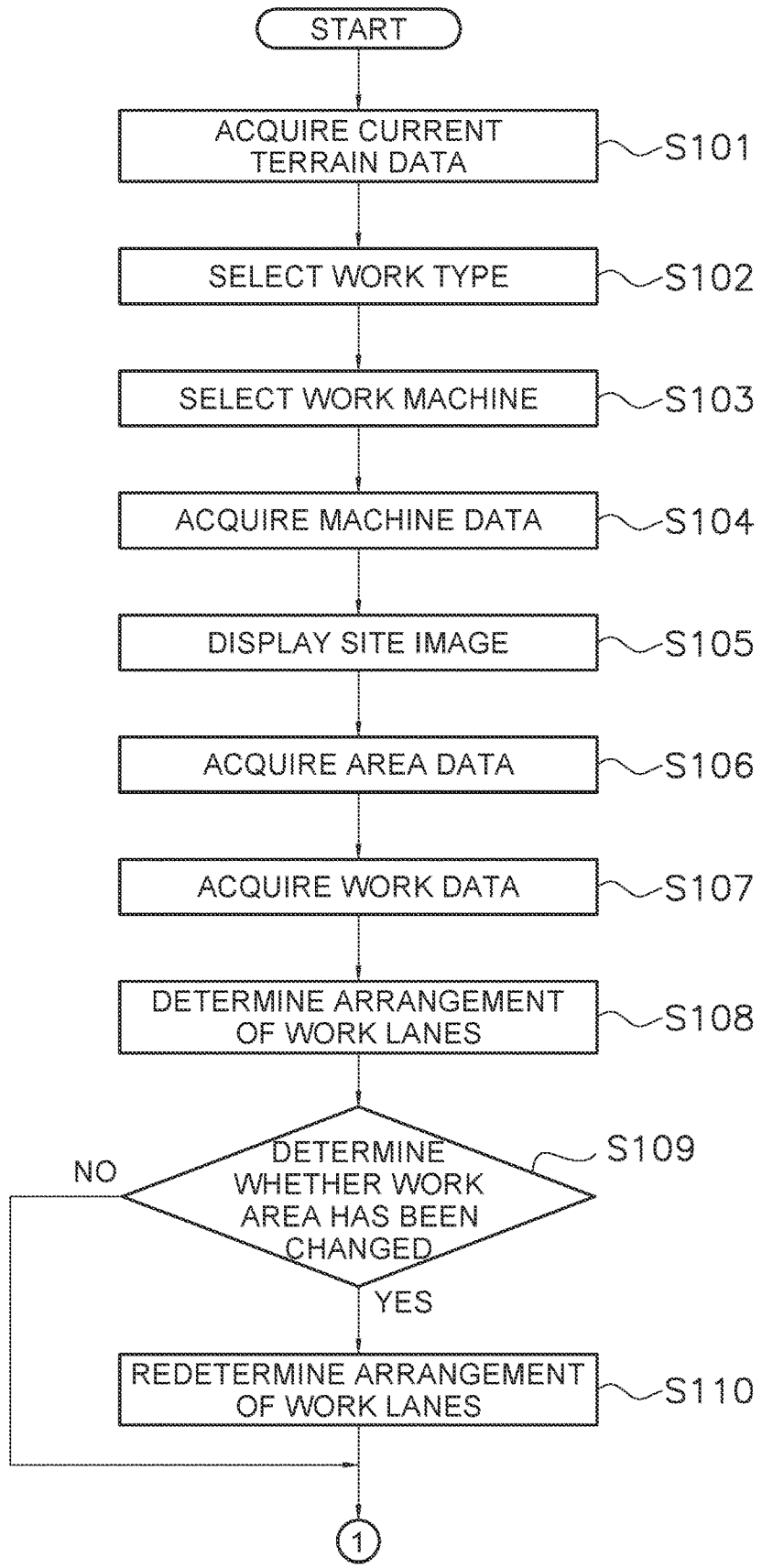
FIG. 4 is a flowchart showing a process of an automatic control executed by a controller.
Figure 5:
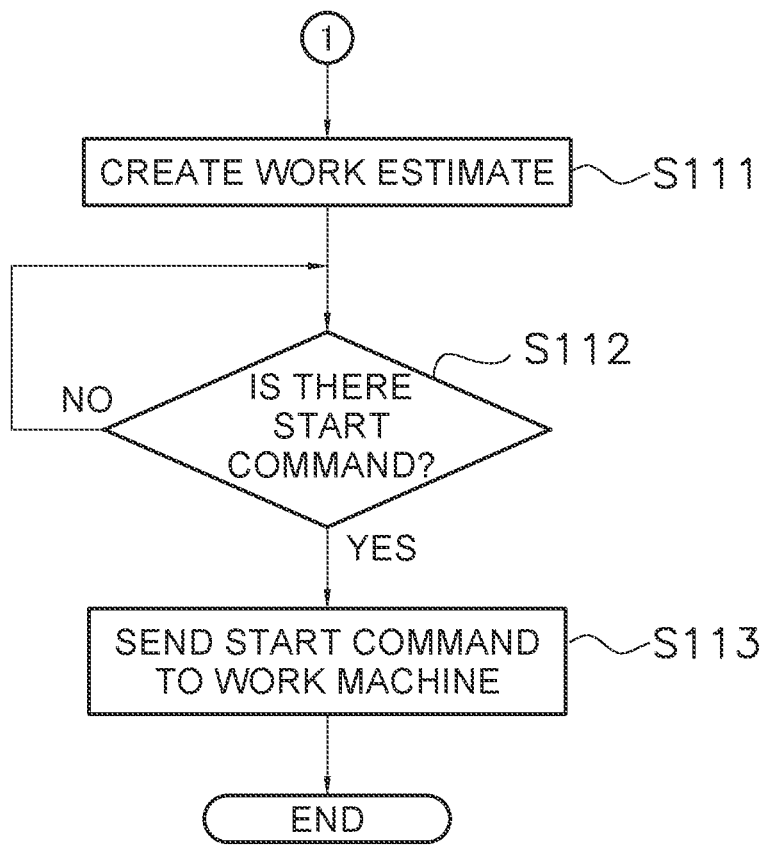
FIG. 5 is a flowchart showing the process of the automatic control executed by the controller.

Next, the control of the work machines 1a to 1c executed by the control system 100 will be described. FIGS. 4 and 5 are flowcharts showing processing performed by the remote controller 2.

Figure 6:
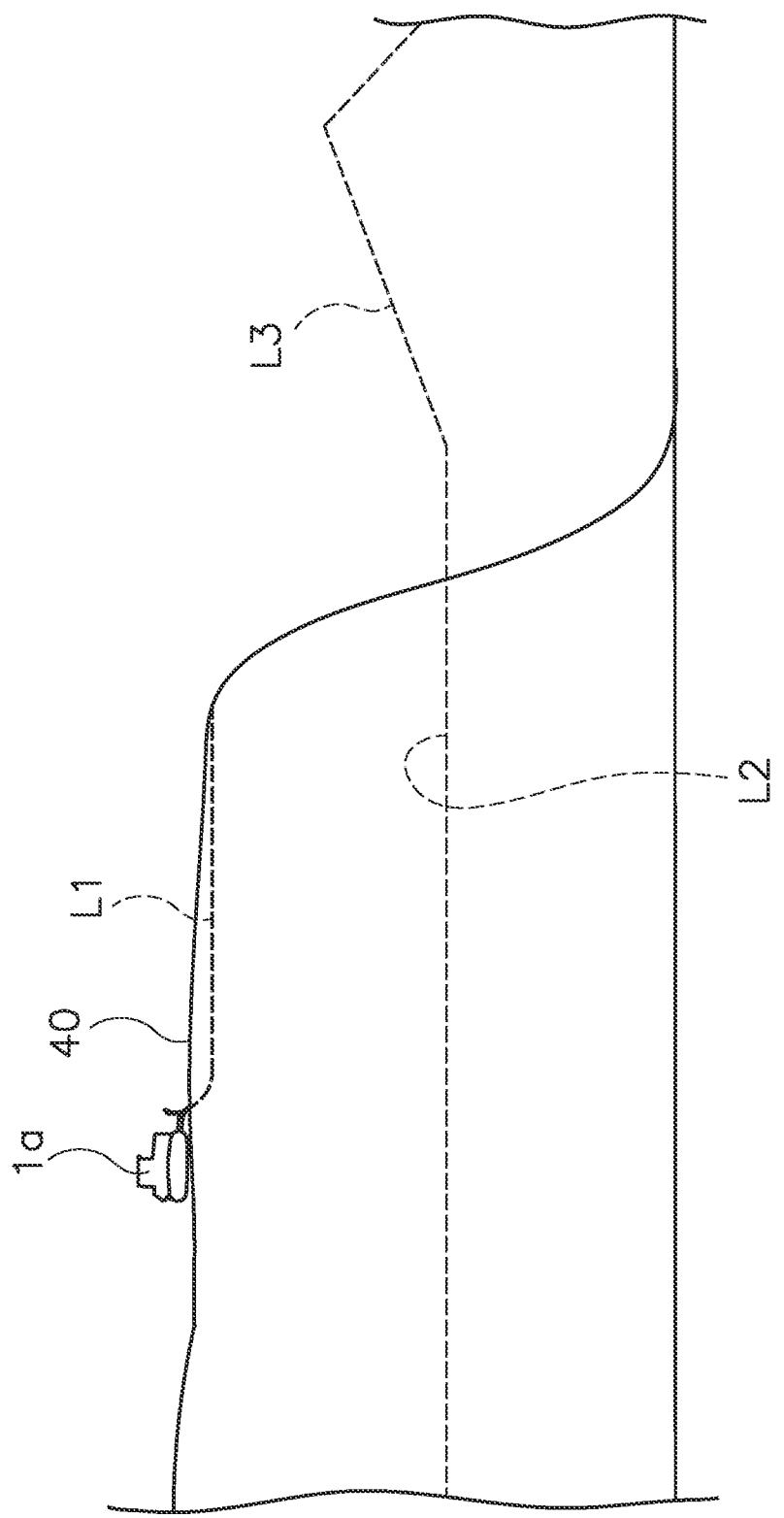
FIG. 6 is a side view showing an example of a current terrain.

As illustrated in FIG. 4, in step S101, the remote controller 2 acquires current terrain data. The current terrain data shows a current terrain of the work site. FIG. 6 is a side view showing an example of the current terrain. The current terrain data includes coordinates and altitudes of a plurality of points on the current terrain 40.

Figure 7:
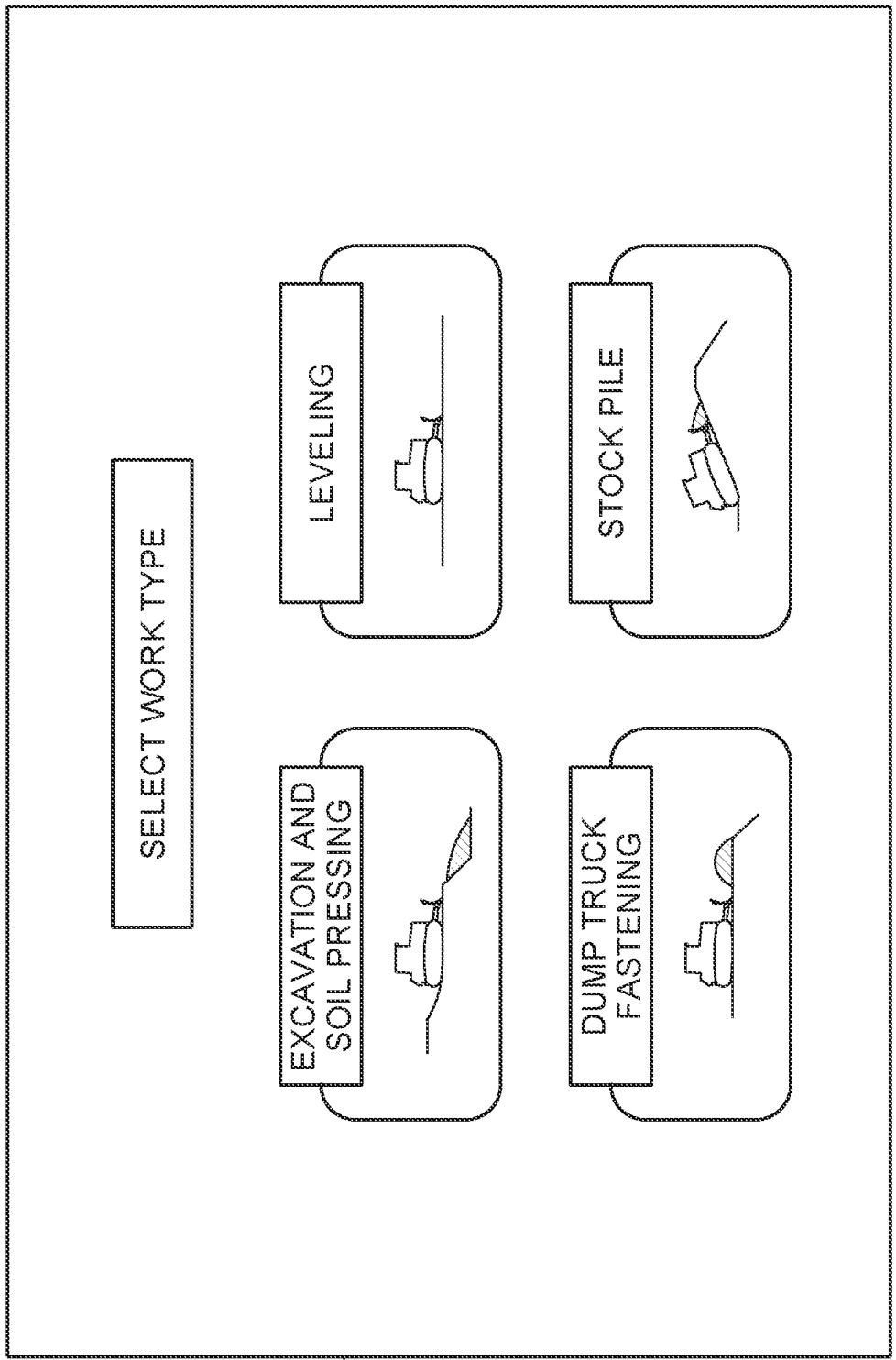
FIG. 7 illustrates a selection screen of a work type.

In step S102, the remote controller 2 selects a work type. FIG. 7 shows an example of a selection screen 41 of the work type. The remote controller 2 displays the selection screen 41 on the display 4. The work type includes, for example, works such as "excavation and soil pressing", "leveling", "dump truck fastening", and "stock pile". However, the work type illustrated in FIG. 7 is an example and may be changed. The operator selects the work type by the input device 3. The remote controller 2 determines the work type based on the operation signal from the input device 3.

Figure 8:
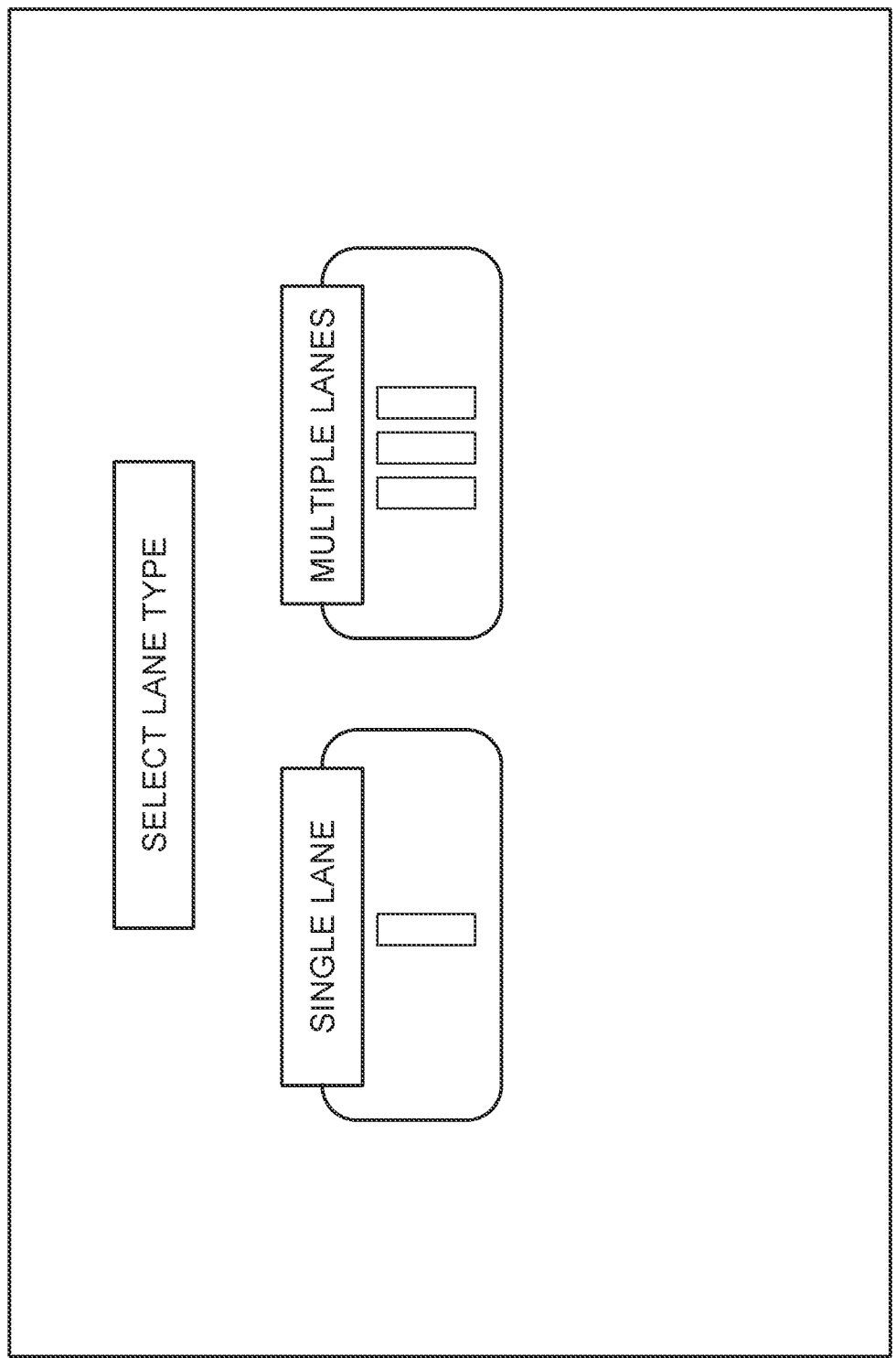
FIG. 8 illustrates a selection screen of a lane type.
Figure 9:
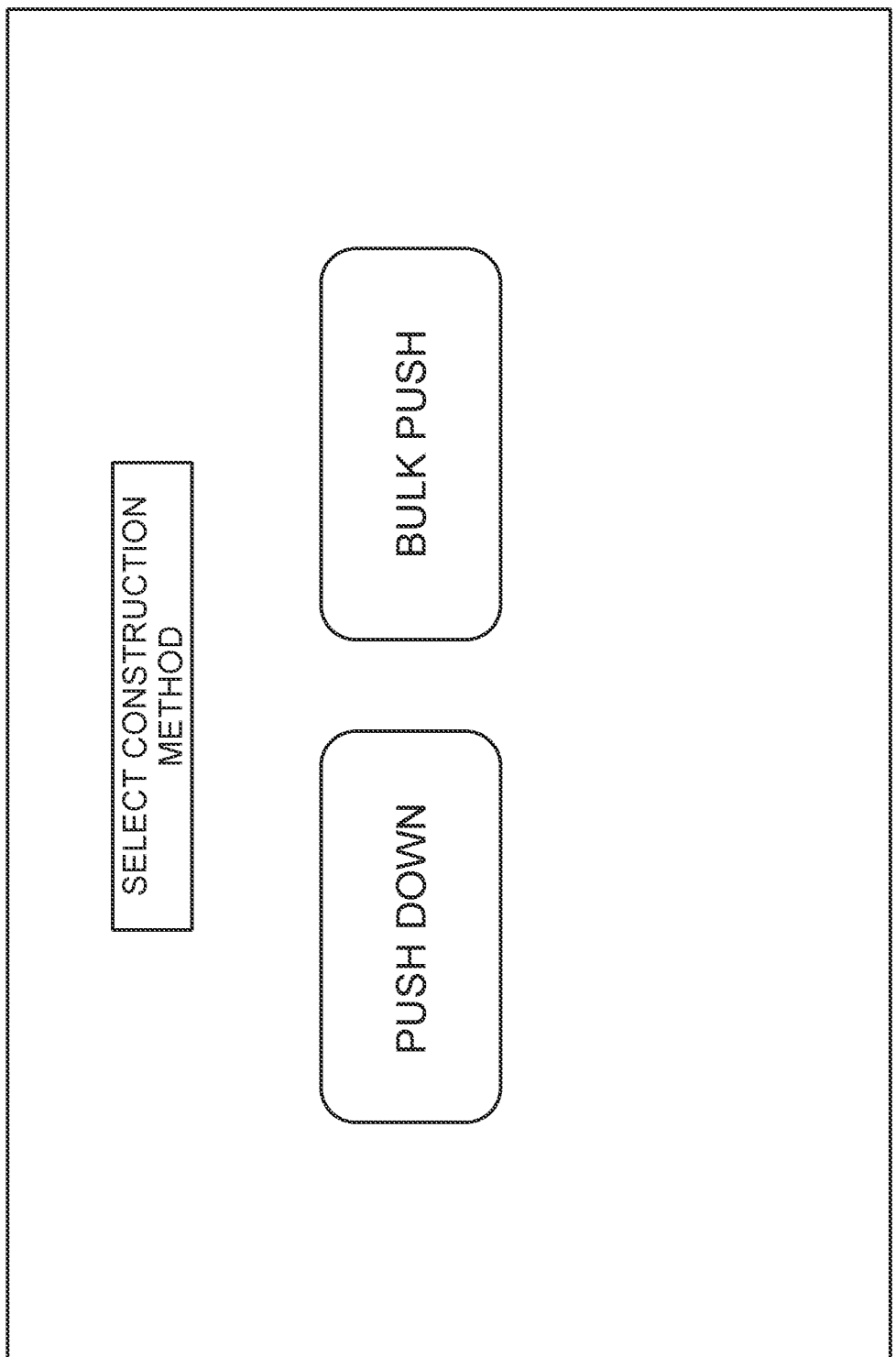
FIG. 9 illustrates a selection screen of a construction method.

When "excavation and soil pressing" is selected, the remote controller 2 displays a selection screen 42 of a lane type illustrated in FIG. 8 on the display 4. The lane type include "single lane" and "multiple lanes". Further, the remote controller 2 displays a selection screen 43 of a construction method illustrated in FIG. 9 on the display 4. The construction method includes, for example, "push down" and "bulk push". "Pushdown" is a work of excavating the current terrain 40 and dropping the excavated soil from the cliff as illustrated by the broken line L1 in FIG. 6. When the current terrain 40 is excavated to the position illustrated by the broken line L2 by the pushdown method, the cliff is filled with soil. "Bulk push" is a work of stacking soil up to a target position indicated by the broken line L3.

The operator selects the lane type and the construction method by the input device 3. The remote controller 2 determines the work type and the construction method based on the operation signal from the input device 3.

In step S103, the remote controller 2 selects a work machine. The remote controller 2 selects a work machine to be assigned to a work area described later. The operator selects the work machine by the input device 3. The remote controller 2 selects a part or all of the work machines 1a to 1c described above. The work machines selected may be singular or plural. The remote controller 2 selects a work machine based on the operation signal from the input device 3.

In step S104, the remote controller 2 acquires machine data. The machine data includes dimensions of the work machine assigned to the work area. Specifically, the machine data includes at least a width dimension of the blade of the work machine assigned to the work area.

In step S105, the remote controller 2 displays a site image 44. The remote controller 2 displays the site image 44 showing at least a part of the work site on the display 4 based on the current terrain data. The site image 44 is a top view of at least a part of the work site. The site image is a topographical image of the work site drawn from a viewpoint looking down from above. The site image 44 may be an aerial image or a satellite image.

Figure 10:
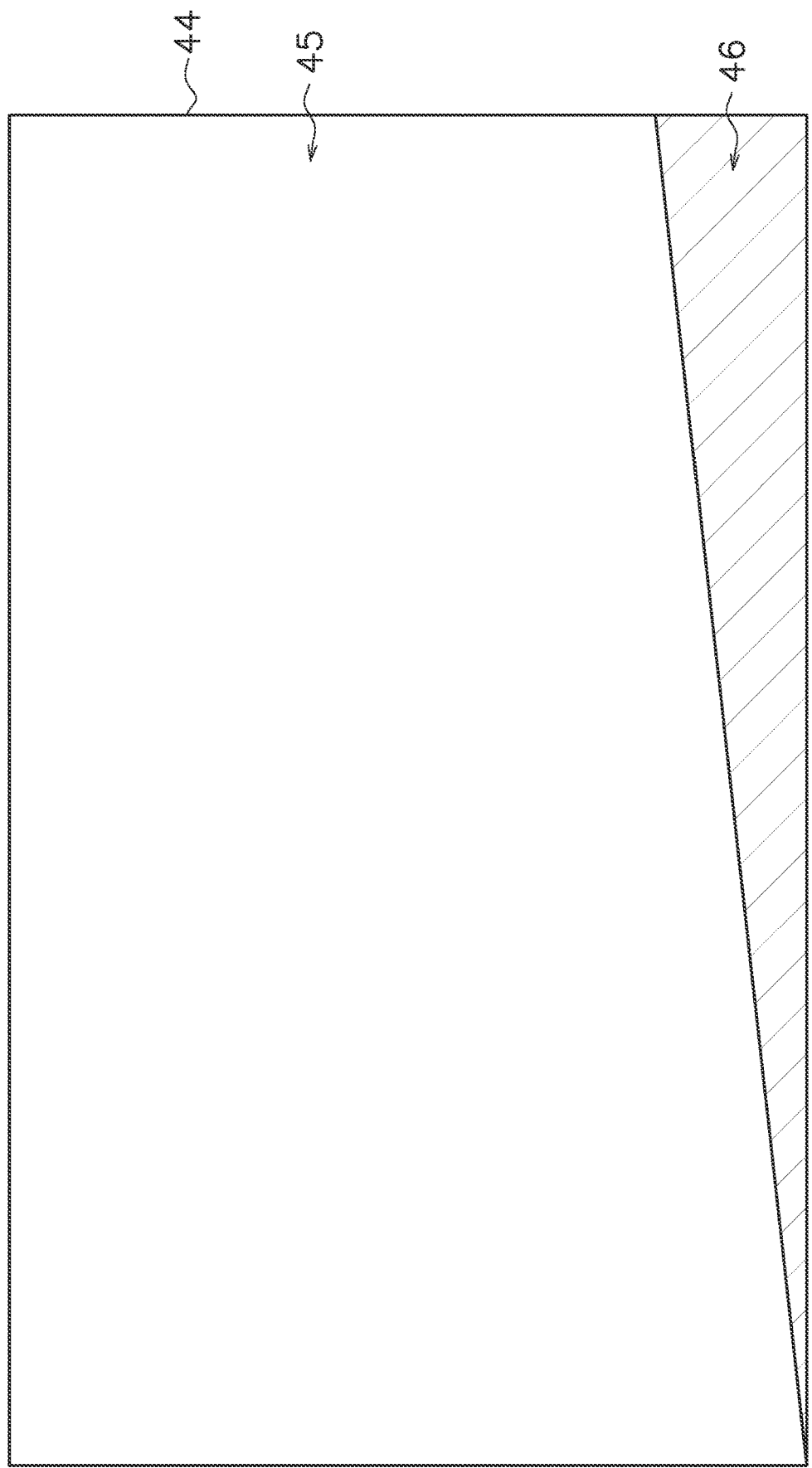
FIG. 10 illustrates an example of a site image.

FIG. 10 is a diagram showing an example of the site image 44. As illustrated in FIG. 10, the site image 44 includes a workable area 45 and a work prohibition area 46. The current terrain data includes a location of the work prohibition area 46 on the work site. The remote controller 2 displays the work prohibition area 46 on the site image 44 based on the current terrain data. The work prohibition area 46 includes, for example, a position of a cliff. The site image 44 may be illustrated along a work direction by work machines 1a to 1c. The work direction may be determined according to a terrain shown in the site image 44. For example, when the boundary B between the workable area 45 and the work prohibition area 46 represents the edge of the cliff, the work prohibition area 46 may be displayed on the lower side in the image 44 so that the work direction of excavation is from the upper side to the lower side of the image.

Figure 11:
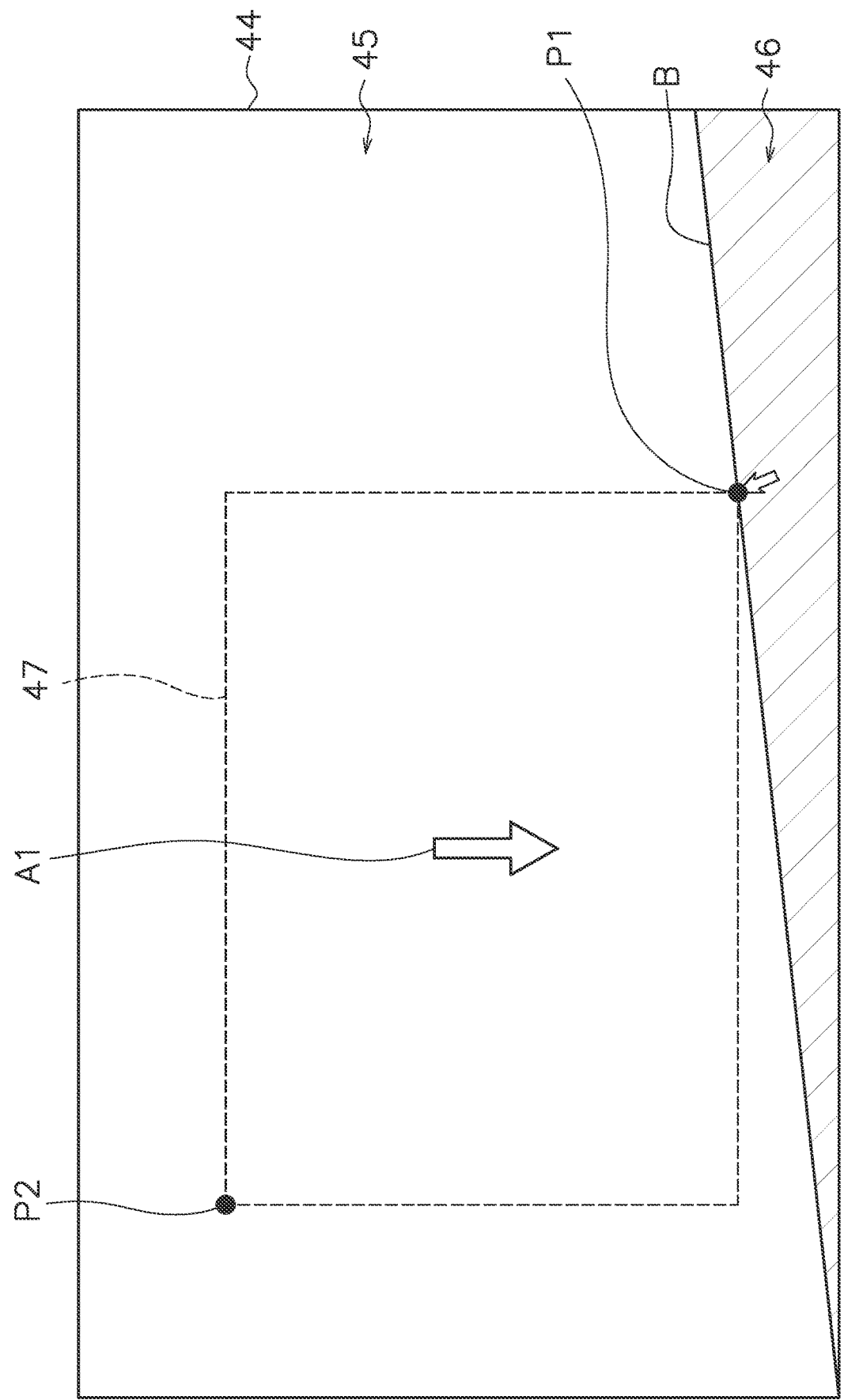
FIG. 11 illustrates a work area designated on the site image.

In step S106, the remote controller 2 acquires area data. As illustrated in FIG. 11, the area data includes a position and a size of the work area 47 designated by the input device 3 on the site image 44. The operator can designate the work area 47 by the input device 3. For example, the operator designates the work area 47 by selecting a range by a drag operation. Alternatively, the operator may designate the work area 47 by inputting the coordinates of the two points P1 and P2 located diagonally to the work area 47. As illustrated in FIG. 11, one point P1 having coordinates located diagonally to the work area 47 may be on the boundary B between the work prohibition area 46 and the workable area 45. In FIG. 11, the work area 47 overlaps only with the work prohibition area 46 at the point P1. However, the point P1 may be set at a position where the other part of the work area 47 also overlaps with the work prohibition area 46.

The remote controller 2 does not accept the designation of the work area 47 in the work prohibition area 46. The remote controller 2 invalidates the designation of the work area 47 when at least a part of the work area 47 overlaps the work prohibition area 46. The remote controller 2 may set a limit on a length and a width of the work area 47. For example, when the length of the work area 47 is smaller than a predetermined length threshold value, the remote controller 2 may invalidate the designation of the work area 47. When the width of the work area 47 is smaller than a predetermined width threshold value, the remote controller 2 may invalidate the designation of the work area 47. The width threshold value may be, for example, a width of one work lane described later.

In step S107, the remote controller 2 acquires work data. The work data indicates the work direction A1 in the work area 47. The operator can select the work direction A1 by the input device 3. The remote controller 2 acquires the work direction A1 based on the operation signal from the input device 3.

Figure 12:
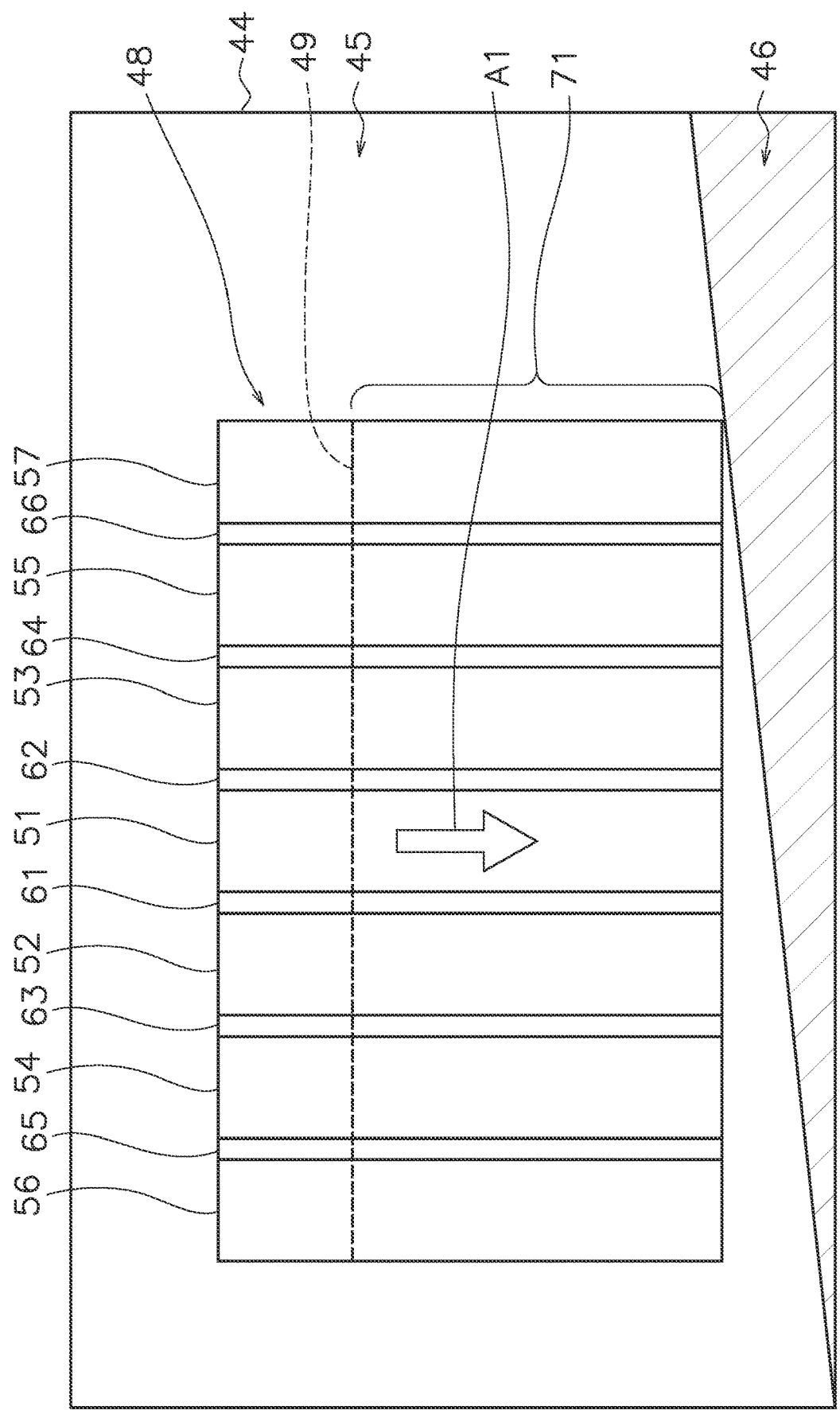
FIG. 12 illustrates an example of an arrangement of work lanes.

In step S108, the remote controller 2 determines an arrangement of work lanes. The remote controller 2 determines the arrangement in the work area 47 of the plurality of work lanes based on the area data and the work data. FIG. 12 is a diagram showing an example of an arrangement of work lanes 51 to 57. As illustrated in FIG. 12, each of the plurality of work lanes 51 to 57 extends in the work direction A1. The remote controller 2 determines the arrangement of the plurality of work lanes 51 to 57 so that the plurality of work lanes 51 to 57 are arranged in the width direction. The width direction is a direction perpendicular to the work direction A1. Areas 61 to 66 of the excavation wall are arranged between the plurality of work lanes 51 to 57. The excavation wall is a soil windrow that remains after each work lane 51 to 57 has been excavated.

The remote controller 2 determines the width of the work lanes 51 to 57 based on the machine data. The remote controller 2 determines, for example, the width dimension of the blade as the width of the work lanes 51 to 57. The remote controller 2 determines the width of the areas 61 to 66 of the excavated wall based on the machine data. The remote controller 2 determines a value smaller than the width dimension of the blade as the width of the areas 61 to 66 of the excavation wall.

Figure 13A:
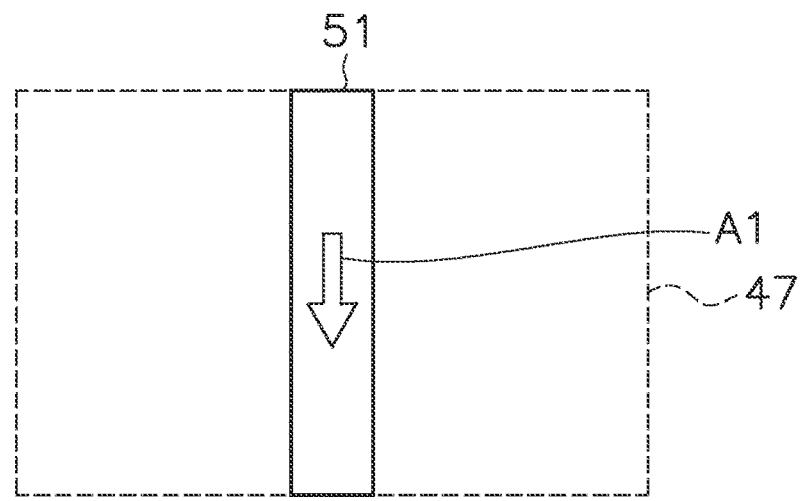
FIG. 13A, FIG. 13B and FIG. 13C illustrate a method of determining the arrangement of the work lanes.
Figure 13B:
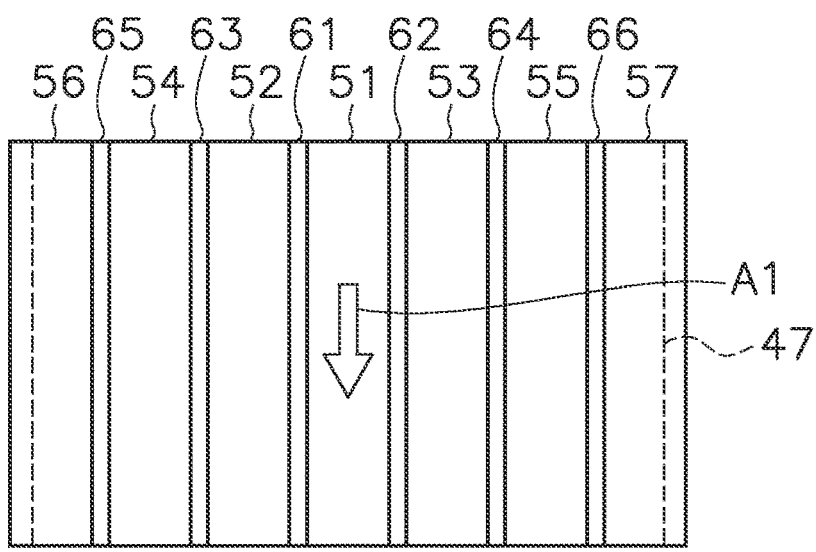
Figure 13C:
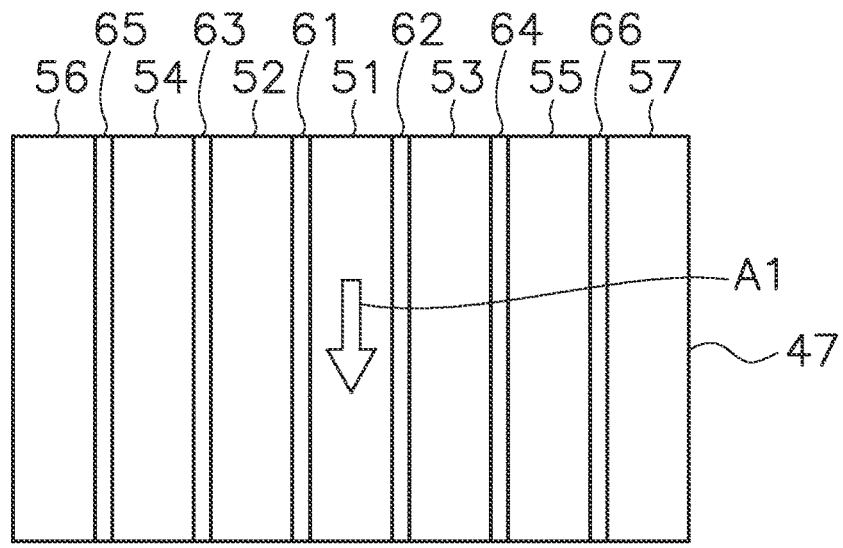

As illustrated in FIG. 13A, the remote controller 2 arranges the first work lane 51 at the center of the work area 47 (hereinafter, referred to as "initial work area 47") designated in step S106. As illustrated in FIG. 13B, the remote controller 2 arranges the work lanes 52 to 57 having the same length as the first work lane 51 on both sides in the width direction of the first work lane 51. The remote controller 2 arranges the work lanes 51 to 57 until the work area 47 is overflowed. As illustrated in FIG. 13C, the remote controller 2 redetermines the work area 47 so as to include the work lanes 56 and 57 that extends beyond the initial work area 47. That is, the remote controller 2 modifies the width of the work area 47 so that the entire work lanes 51 to 57 fit in the work area 47.

Figure 14:
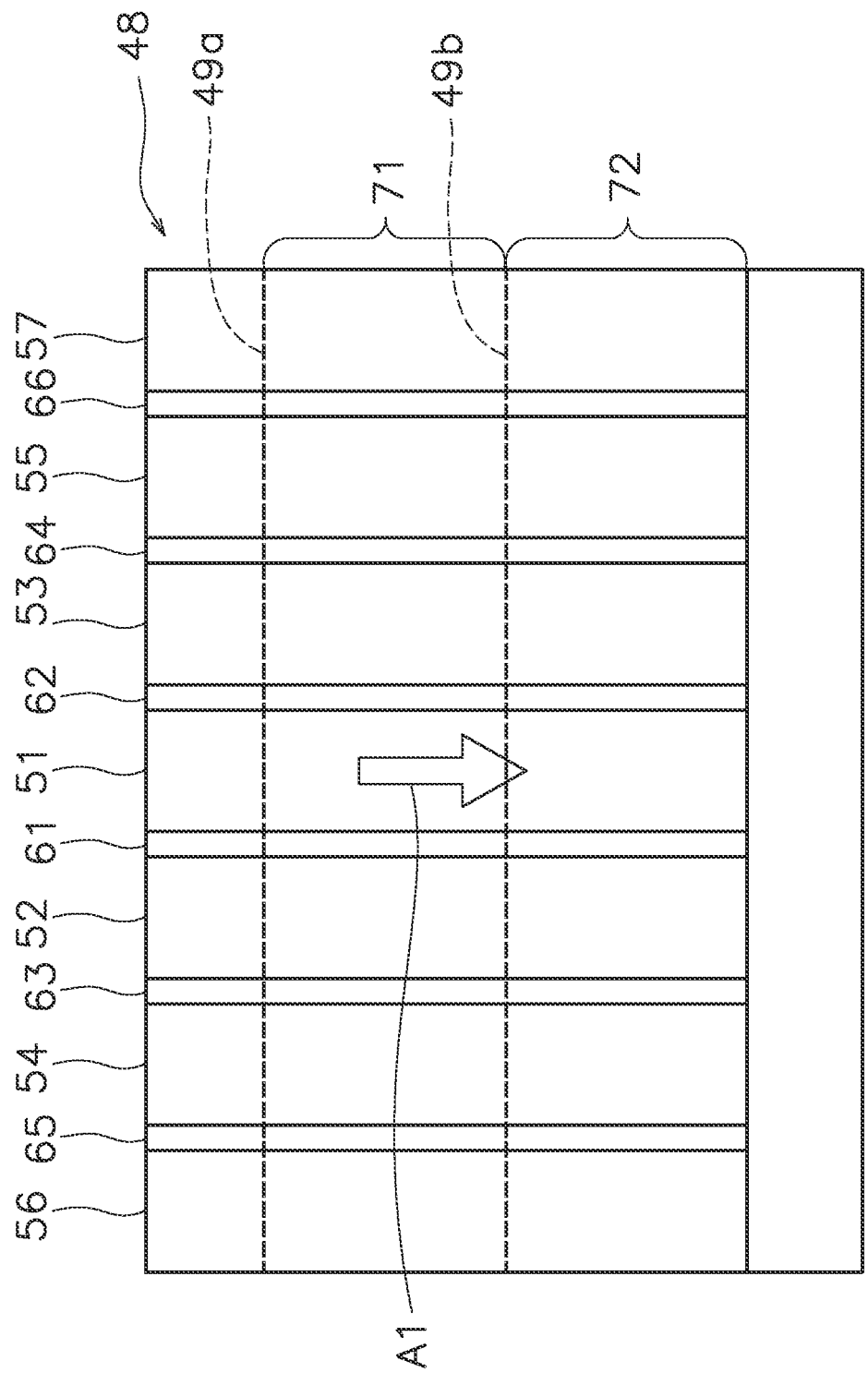
FIG. 14 illustrates an example of a specific area in bulk push.

The remote controller 2 displays a lane image 48 on the site image 44. The lane image 48 shows the arrangement of the work lanes 51 to 57 in the work area 47 and the areas 61 to 66 of the excavation wall. As illustrated in FIG. 11, the lane image 48 includes an area division sign 49. The area division sign 49 is a sign indicative of a specific area included in each work lane 51 to 57. The remote controller 2 determines the position of the specific area according to the selected construction method. For example, as illustrated in FIG. 11, the specific area in the pushdown includes the excavation area 71. The area division sign 49 indicates the position of the start end of the excavation area 71. The area division sign 49 may indicate the position of the terminal end of the excavation area 71. As illustrated in FIG. 14, the specific area in the bulk push includes the excavation area 71 and the soil placement area 72. The area division sign 49a indicates the position of the start end of the excavation area 71. The area division sign 49b indicates the positions of the terminal end of the excavation area 71 and the start end of the soil placement area 72. The area division sign may indicate the position of the terminal end of the soil placement area 72.

In step S109, the remote controller 2 determines whether the work area 47 has been changed. The operator can change the work area 47 by the input device 3. The remote controller 2 determines whether the work area 47 has been changed based on the operation signal from the input device 3.

Figure 15:
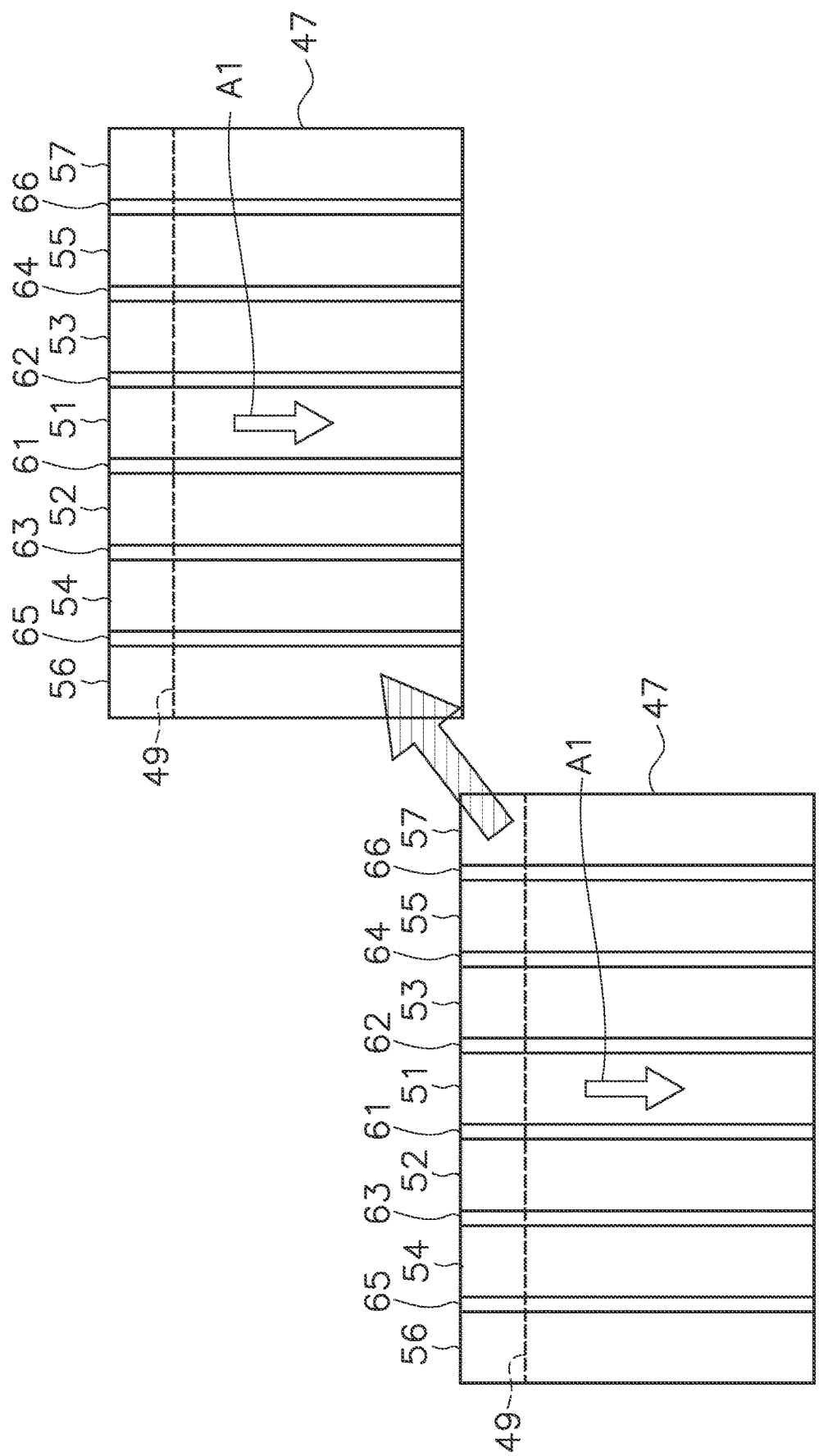
FIG. 15 illustrates an example of a method of changing the work area.
Figure 16:
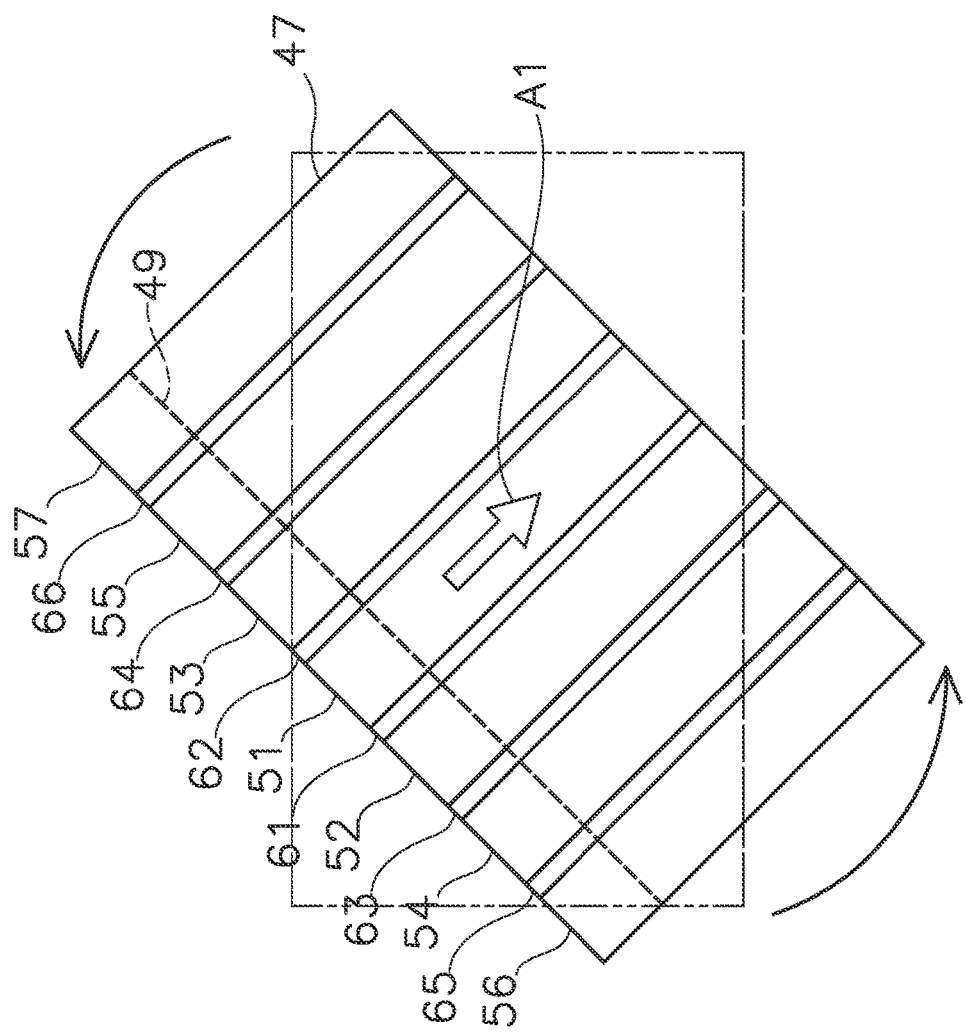
FIG. 16 illustrates an example of the method of changing the work area.

The operator can move the work area 47 by the input device 3. As illustrated in FIG. 15, the remote controller 2 moves the work area 47 on the site image 44 according to the operation by the input device 3. The operator can rotate the work area 47 by the input device 3. As illustrated in FIG. 16, the remote controller 2 rotates the work area 47 on the site image 44 according to the operation by the input device 3.

Figure 17:
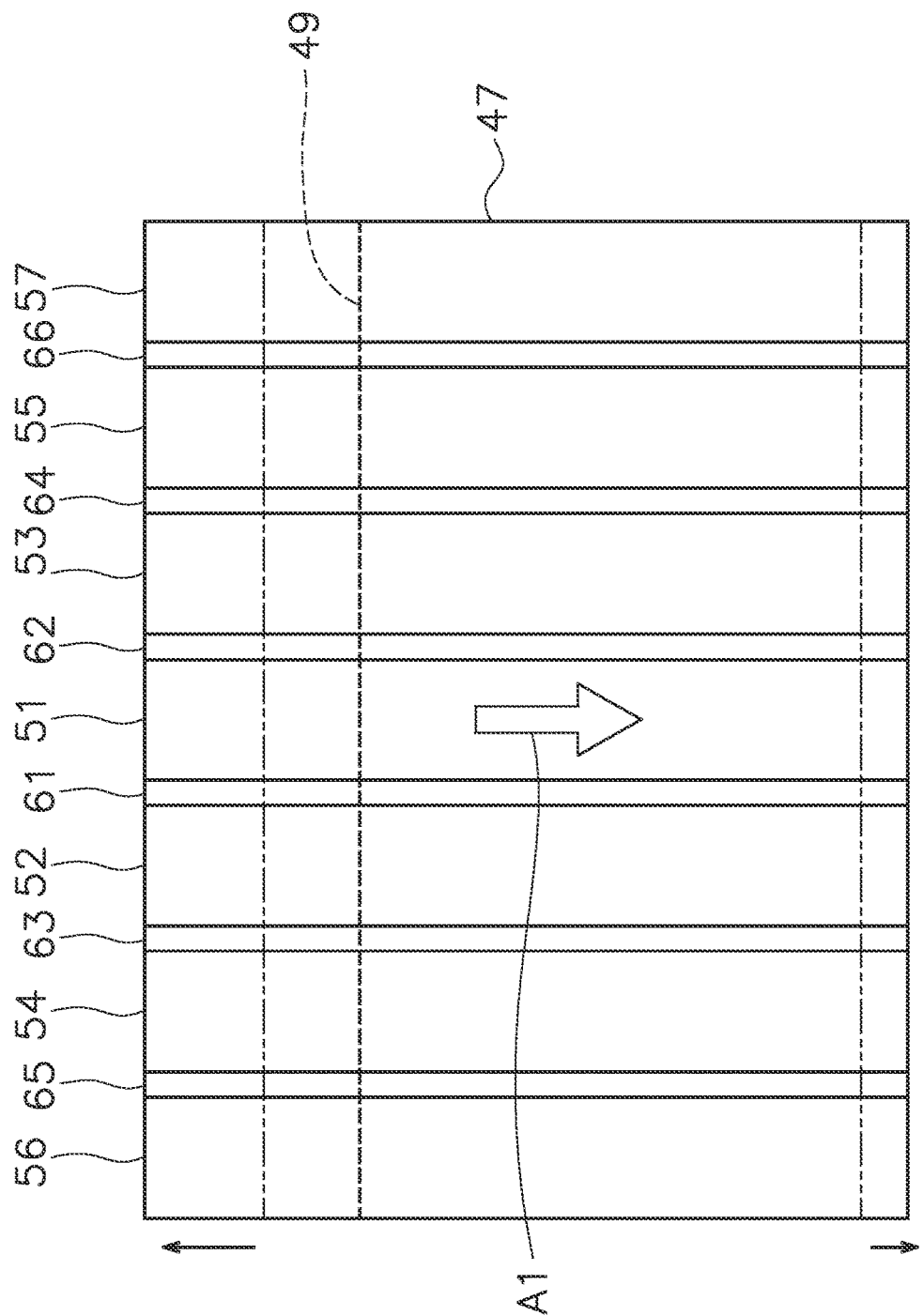
FIG. 17 illustrates an example of the method of changing the work area.
Figure 18:
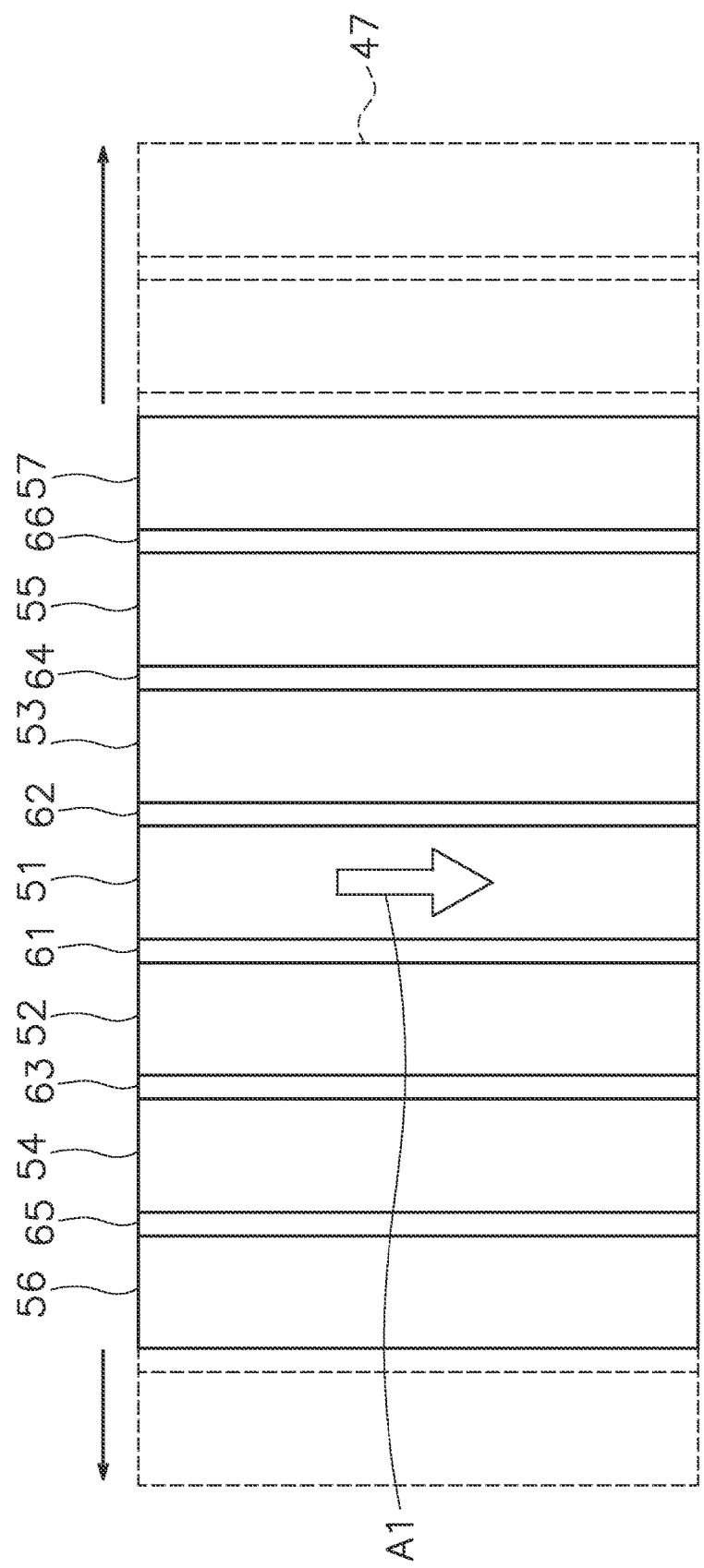
FIG. 18 illustrates an example of the method of changing the work area.

The operator can enlarge or reduce the work area 47 by the input device 3. The remote controller 2 enlarges or reduces the work area 47 on the site image 44 according to the operation by the input device 3. For example, as illustrated in FIG. 17, the remote controller 2 enlarges or reduces the work area 47 in the work direction A1 on the site image 44 according to the operation by the input device 3. Alternatively, as illustrated in FIG. 18, the remote controller 2 enlarges or reduces the work area 47 in the width direction on the site image 44 according to the operation by the input device 3. In this case, the remote controller 2 enlarges or reduces the work area 47 in the width direction by one width of the work lanes 51 to 57 according to the operation by the input device 3.

As described above, when the work area 47 is changed, the process proceeds to step S110. In step S110, the remote controller 2 redetermines the arrangement of the plurality of work lanes 51 to 57 according to the position of the changed work area 47. For example, when the work area 47 moves, the remote controller 2 redetermines the arrangement of the plurality of work lanes 51 to 57 according to the position of the work area 47 after the movement. When the work area 47 is rotated, the remote controller 2 redetermines the arrangement of the plurality of work lanes 51 to 57 according to the position of the work area 47 after the rotation. When the work area 47 is enlarged or reduced, the remote controller 2 redetermines the arrangement of the plurality of work lanes 51 to 57 according to the position of the enlarged or reduced work area 47. The remote controller 2 updates the area division sign 49 according to the arrangement of the redetermined work lanes 51 to 57.

Figure 19:
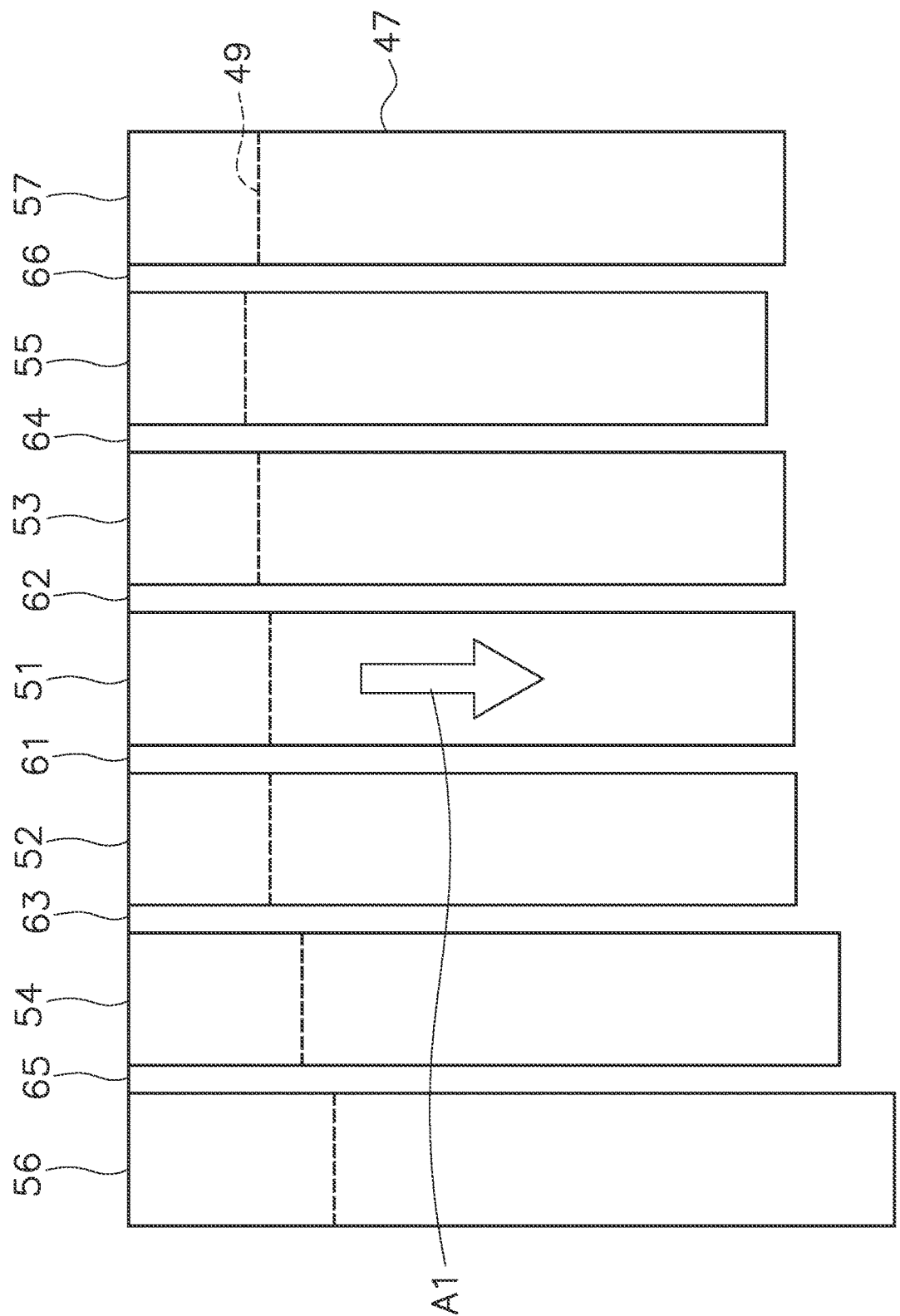
FIG. 19 illustrates an example of the method of changing the work area.

The operator can individually modify the lengths of the plurality of work lanes 51 to 57 in the work direction A1 by the input device 3. As illustrated in FIG. 19, the remote controller 2 modifies the respective lengths of the plurality of work lanes 51 to 57 in the work directions A1 according to the operation by the input device 3. In this case, the controller updates the area division sign 49 of each work lane 51 to 57 according to the modified arrangement of work lanes 51 to 57.

Figure 20:
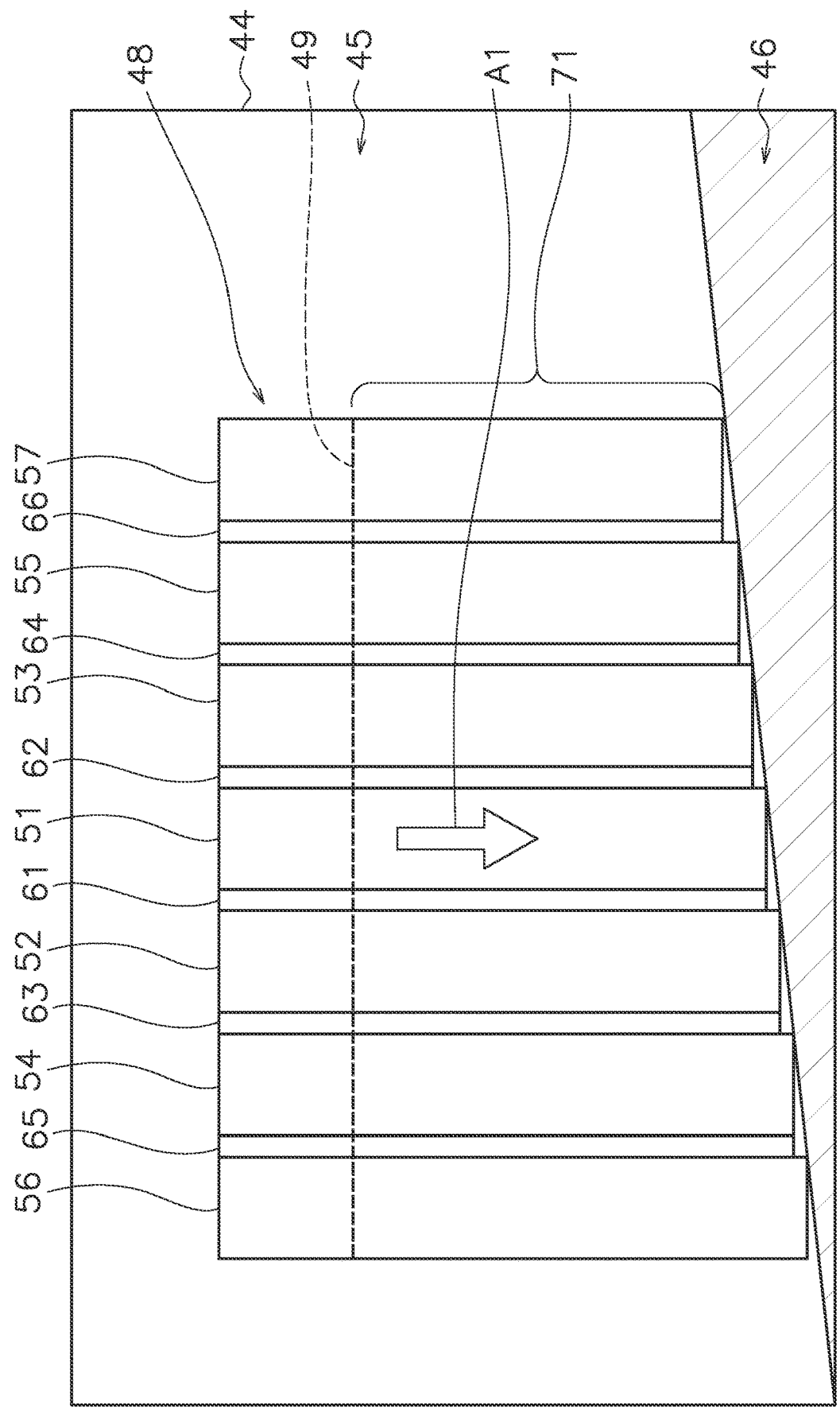
FIG. 20 illustrates an example of the method of changing the work area.

Alternatively, the remote controller 2 may modify the lengths of the plurality of work lanes 51 to 57 in the work direction A1 according to the current terrain data. For example, in the push down method, the excavated and pushed soil is dropped from the edge of the cliff indicated by the boundary B between the work prohibition area 46 and the workable area 45. The initial work area 47 overlaps the work prohibition area 46 only at the apex P1 as illustrated in FIG. 11. In this case, as illustrated in FIG. 20, the length of each work lane 51 to 57 may be extended until one end in the width direction of each work lane 51 to 57 included in the initial work area 47 abuts on the work prohibition area 46.

As illustrated in FIG. 5, in step S111, the remote controller 2 creates a work estimate. The work estimate indicates evaluation parameters predicted when the work machine performs the work according to the work lanes 51 to 57 determined in steps S101 to S110. The evaluation parameters include, for example, estimated values of an amount of earthwork, a required time, and a fuel cost.

The amount of earthwork is an amount of soil excavated by the work machine. The remote controller 2 calculates an estimated value of the amount of earthwork for each work machine. The required time is a time from the start to the end of the work. The remote controller 2 calculates an estimated value of the required time for each work machine. The fuel cost is a cost of fuel from the start to the end of work. The remote controller 2 calculates an estimated value of the fuel cost for each work machine. The remote controller 2 displays the work estimate including these estimated values on the display 4.

In step S112, the remote controller 2 determines whether or not there is a start command. The operator can instruct the start of work by the work machine by the input device 3. The remote controller 2 determines the presence or absence of the start command based on the operation signal from the input device 3. When it is determined that there is the start command, the process proceeds to step S113.

In step S113, the remote controller 2 sends the start command to the work machine. Thereby, the work machine is controlled to perform the work according to the arrangement of the work lanes 51 to 57. The remote controller 2 sends data indicative of the positions of the work lanes 51 to 57 to the work machine. The work machine excavates according to the order of designated work lanes 51 to 57. The work machine excavates while moving along the assigned work lanes 51 to 57. The work machine also excavates while moving along the designated excavation wall areas 61 to 66. The control of the work machine may be performed by the remote controller 2. Alternatively, the control of the work machine may be performed by the machine controller. Alternatively, the control of the work machine may be shared by the remote controller 2 and the machine controller.

In the control system 100 for the work machine according to the present embodiment described above, the arrangement in the work area 47 of the plurality of work lanes 51 to 57 is determined by designating the work area 47 by the operator using the input device 3. As a result, it is possible to easily instruct the work machine to perform automatic operation.

Although one embodiment has been described above, the present invention is not limited to the above embodiment, and various modifications can be made without departing from the gist of the invention.

The work machine is not limited to a bulldozer, and may be another vehicle such as a wheel loader, a motor grader, or a hydraulic excavator. The work machine may be a vehicle driven by an electric motor.

The remote controller or the machine controller may have a plurality of controllers that are separate from each other. The processing of the remote controller or the machine controller described above may be distributed to a plurality of controllers and executed. Each of the remote controller or the machine controller may have a plurality of controllers. The above-mentioned processing may be distributed to a plurality of controllers and executed. The above-mentioned processing may be distributed to a plurality of processors and executed.

The process for determining the work area is not limited to that of the above-described embodiment, and may be changed, omitted, or added. The execution order of the above-mentioned processes is not limited to that of the above-described embodiment, and may be changed. Part of the processing by the machine controller may be performed by the remote controller. Part of the processing by the remote controller may be performed by the machine controller.

The control of the work machine may be fully automatic or semi-automatic. For example, the input device may include an operating member such as an operating lever, pedal, or switch for operating the work machine. The remote controller may control the travel of the work machine such as forward movement, reverse movement, or turning according to the operation of the input device. The remote controller may control operations such as raising and lowering of the work implement according to the operation of the input device.

According to the present disclosure, an operator designates a work area using an input device to determine an arrangement of a plurality of work lanes in the work area. As a result, it is possible to easily instruct a work machine to perform an automatic operation.

The invention claimed is:

1. A system for controlling a work machine at a work site, the system comprising:
    an input device that is operable by an operator;
    a display; and
    a processor that
        receives a signal indicative of an operation of the input device and
        outputs a signal in order to display an image on the display,
    the processor being configured to
        acquire current terrain data indicative of a current terrain of the work site,
        display a site image indicative of at least a part of the work site on the display based on the current terrain data,
        acquire area data including a position and a size of a work area designated by the input device on the site image,
        acquire work data indicative of a work direction in the work area,
        determine an arrangement of a plurality of work lanes extending in the work direction in the work area based on the area data and the work data, each of the plurality of work lanes including a specific area designated as an excavation area or a soil placement area,
        determine a position of a start end of the specific area of each of the plurality of work lanes in accordance with the arrangement of the plurality of lanes,
        control the display to display the arrangement of the plurality of work lanes and the position of the start end of the specific area, and
        send an automatic operation command to the work machine according to the arrangement of the work lanes.

2. The system according to claim 1, wherein
    the processor is further configured to determine the arrangement of the plurality of work lanes so that the plurality of work lanes are arranged in a width direction perpendicular to the work direction.

3. The system according to claim 1, wherein the processor is further configured to
acquire machine data including a dimension of the work machine assigned to the work area, and
determine a width of each of the plurality of work lanes based on the dimension of the work machine.

4. The system according to claim 1, wherein the processor is further configured to modify a width of the work area so that the entire work lanes fits within the work area.

5. The system according to claim 1, wherein the current terrain data includes a position of a work prohibition area on the worksite, and
the processor is further configured to invalidate a designation of the work area in the work prohibition area.

6. The system according to claim 1, wherein the processor is further configured to
move the work area on the site image according to the operation by the input device, and
redetermined the arrangement of the plurality of work lanes according to the position of the work area after moving.

7. The system according to claim 1, wherein the processor is further configured to
change the work area to be enlarged or reduced in the work direction on the site image according to the operation by the input device, and
redetermine the arrangement of the plurality of work lanes according to the position of the work area after changing.

8. The system according to claim 1, wherein the processor is further configured to
change the work area to be enlarged or reduced in a width direction perpendicular to the work direction on the site image according to the operation by the input device, and
redetermine the arrangement of the plurality of work lanes according to a position of the work area after changing.

9. The system according to claim 8, wherein the processor is further configured to enlarge or reduce the work area in the width direction by a width of the work lane according to the operation by the input device.

10. The system according to claim 1, wherein the processor is further configured to modify a length of each of the plurality of work lanes in the work direction according to the operation by the input device or the current terrain data.

11. The system according to claim 1, wherein the processor is further configured to
acquire a work type by the work machine according to the operation by the input device,
determine at least one estimated value of an amount of work, a required time, and a fuel cost according to the work type, and
display the estimated value on the display.

12. A system for controlling a work machine at a work site, the system comprising:
an input device that is operable by an operator;
a display; and
a processor that
receives a signal indicative of an operation of the input device and
outputs a signal in order to display an image on the display, the processor being configured to
acquire current terrain data indicative of a current terrain of the work site,
display a site image indicative of at least a part of the work site on the display based on the current terrain data,
acquire area data including a position and a size of a work area designated by the input device on the site image,
acquire work data indicative of a work direction in the work area,
determine an arrangement of a plurality of work lanes extending in the work direction in the work area based on the area data and the work data, and
send an automatic operation command to the work machine according to the arrangement of the work lanes
the processor being further configured to
rotate the work area on the site image according to the operation by the input device, and
redetermine the arrangement of the plurality of work lanes according to the position of the work area after rotating.

13. A method performed by a processor for controlling a work machine at a work site, the method comprising:
acquiring current terrain data indicative of a current terrain of the work site;
displaying a site image indicative of at least a part of the work site on a display based on the current terrain data;
receiving a signal indicative of an operation by an operator from an input device;
acquiring area data including a position and a size of a work area designated by the input device on the site image;
acquiring work data indicative of a work direction in the work area;
determining an arrangement of a plurality of work lanes extending in the work direction in the work area based on the area data and the work data, each of the plurality of work lanes including a specific area designated as an excavation area or a soil placement area;
determining a position of a start end of the specific area of each of the plurality of work lanes in accordance with the arrangement of the plurality of lanes;
controlling the display to display the arrangement of the plurality of work lanes and the position of the start end of the specific area; and
sending an automatic operation command to the work machine according to the arrangement of the work lanes.

14. The method according to claim 13, further comprising:
determining the arrangement of the plurality of work lanes so that the plurality of work lanes are arranged in a width direction perpendicular to the work direction.

15. The method according to claim 13, further comprising:
acquiring machine data including a dimension of the work machine assigned to the work area; and
determining a width of each of the plurality of work lanes based on the dimension of the work machine.

16. The method according to claim 13, wherein the work area includes a workable area and a work prohibition area, and
the method further comprises:

modifying at least one of a width and a length of the work area so that the entire work lanes fits within the workable area.

17. The method according to claim 13, wherein
the current terrain data includes a position of a work prohibition area on the worksite, and
the method comprises:
invalidating a designation of the work area in the work prohibition area.

18. The method according to claim 13, further comprising:
moving the work area on the site image according to the operation by the input device; and
redetermining the arrangement of the plurality of work lanes according to the position of the work area after moving.

19. The method according to claim 13, further comprising:
changing the work area on the site image to be enlarged or reduced in the work direction according to the operation by the input device; and
redetermining the arrangement of the plurality of work lanes according to the position of the work area after changing.

20. A method performed by a processor for controlling a work machine at a work site, the method comprising:
acquiring current terrain data indicative of a current terrain of the work site;
displaying a site image indicative of at least a part of the work site on the display based on the current terrain data;
receiving a signal indicative of an operation by an operator from an input device;
acquiring area data including a position and a size of a work area designated by the input device on the site image;
acquiring work data indicative of a work direction in the work area;
determining an arrangement of a plurality of work lanes extending in the work direction in the work area based on the area data and the work data;
sending an automatic operation command to the work machine according to the arrangement of the work lanes;
rotating the work area on the site image according to the operation by the input device; and
redetermining the arrangement of the plurality of work lanes according to the position of the work area after rotating.

* * * * *